United States Patent [19]
Hatanaka et al.

[11] Patent Number: 6,130,735
[45] Date of Patent: Oct. 10, 2000

[54] REFLECTIVE LIQUID CRYSTAL DISPLAY DEVICE HAVING FRONT SCATTERING FILMS

[75] Inventors: Takayuki Hatanaka, Kanazawa; Shingo Fujita; Hisanori Yamaguchi, both of Ishikawa-gun; Tetsu Ogawa, Kanazawa, all of Japan

[73] Assignee: Matsushita Electric Industrial Co., Ltd., Japan

[21] Appl. No.: 09/093,184

[22] Filed: Jun. 8, 1998

[30]     Foreign Application Priority Data

Jun. 16, 1997  [JP]  Japan .................................. 9-158846
Sep. 30, 1997  [JP]  Japan .................................. 9-265378

[51] Int. Cl.$^7$ ................................................ G02F 1/1335
[52] U.S. Cl. ........................ 349/113; 349/114; 349/117
[58] Field of Search ................................... 349/113, 114, 349/117, 112

[56]              References Cited

U.S. PATENT DOCUMENTS

| | | | |
|---|---|---|---|
| 5,684,551 | 11/1997 | Nakamura et al. | 349/99 |
| 5,724,112 | 3/1998 | Yoshida et al. | 349/117 |
| 5,734,455 | 3/1998 | Yoshida et al. | 349/99 |
| 5,828,471 | 5/2000 | Davis et al. | 359/15 |
| 6,008,871 | 12/1999 | Okumura | 349/61 |
| 6,011,605 | 1/2000 | Mizuno et al. | 349/113 |
| 6,061,111 | 5/2000 | Kataoka et al. | 349/113 |

FOREIGN PATENT DOCUMENTS

| | | |
|---|---|---|
| 0 777 145 A2 | 6/1997 | European Pat. Off. . |
| 8-201802 | 8/1996 | Japan . |
| 08338993 | 12/1996 | Japan . |
| 09073070 | 3/1997 | Japan . |
| 2 306 229 | 4/1997 | United Kingdom . |

OTHER PUBLICATIONS

Seiki et al., "LP–F: A New Reflective Display with High Multiplexibility and Gray Scale Capability", Euro Display '96, pp. 464–467.

IBM Technical Disclosure Bulletin, "Light Diffuser with Controlled Divergence", vol. 29, No. 1, Jun. 1986, pp. 276–279.

Seiki et al., "A New Reflective Color Guest–Host Display with Scattering Effect", Mol. Cryst. Liq. Cryst. 1997, vol. 304, pp. 125–131.

Tedesco, "Holographic diffusers for LCD cockpit displays", SPIE vol. 2219 Cockpit Displays (1994), pp. 327–337.

Primary Examiner—Kenneth Parker
Assistant Examiner—Mike Qi
Attorney, Agent, or Firm—Parkhurst & Wendel, L.L.P.

[57]                ABSTRACT

A reflective liquid crystal display device comprising a polarizer, a retardation film, a front scattering film layer, and a liquid crystal cell having a mirror reflector, in which the front scattering film layer includes at least one film of which scattering angle range is asymmetrical to the normal direction of film. A plural front scattering films of which scattering angle range is asymmetrical to the film normal are laminated so that the projection direction onto the film surface in the central angle direction of the scattering angle range may be different. At least one of the scattering films for composing the scattering film layer is a front scattering film for scattering more strongly the transmission light from the second incident angle region not containing the film normal direction than the transmission light from the first incident angle region containing the film normal direction.

19 Claims, 13 Drawing Sheets

(a)

(b)

REFLECTIVE LIQUID CRYSTAL DISPLAY DEVICE HAVING FRONT SCATTERING FILMS

FIELD OF THE INVENTION

The present invention relates to a reflective liquid crystal display device which is bright, high in contrast, and wide in angle of viewing field.

BACKGROUND OF THE INVENTION

Along with rapid progress in information communication appliances such as mobile telephone, PHS (personal handyphone system), and PDA (personal digital assistants), the infrastructure capable of accessing and transmitting easily anytime, anywhere, by anyone is being prepared. They are intended for mobile applications, and the display unit of light weight, thin structure, and low power consumption is required, and the liquid crystal display device is presently in the mainstream. The liquid crystal display device is designed to display by varying the light transmission intensity by driving liquid crystal molecules at an effective voltage of several volts, but the liquid crystal itself is a non-luminous substance, and some other light source is needed. The light source requires a very large power supply as compared with the power for driving the liquid crystal, but a reflective liquid crystal display device for displaying by utilizing the surrounding light by disposing a reflector at the lower side of the liquid crystal display device can realize a display device making use of the intrinsic feature of extremely low power consumption of the liquid crystal. The reflective liquid crystal display device comes to be indispensable as one of displays for mobile information terminals.

In the reflective liquid crystal display device, however, since the surrounding light is utilized for display, the brightness can be obtained only in the specular reflection direction of incident light to the display device. Accordingly, to extend the angle of the viewing field, it is proposed to use a scattering film for scattering the light into other regions than the specular reflection direction.

Conventional reflective liquid crystal display devices include, among others, the one using a front scattering film as disclosed in Japanese Laid-open Patent No. 8-201802 (hereinafter called prior art I), and the one having scattering characteristics by undulations formed on an upper substrate or the like as disclosed in Japanese Laid-open Patent No. 8-338993 (hereinafter called prior art II).

However, if provided with scattering characteristics by undulations as in prior art II, back scattering occurs at the time of incidence of surrounding light into the liquid crystal display device. As a result, the reflectivity in black display is not lowered sufficiently, and high contrast is not obtained.

FIG. 13 shows a structure of the reflective liquid crystal display device of prior art I, in which reference numeral 80 is a front scattering film, 81 is a polarizer, 82 is a retardation film, 83 is a liquid crystal cell, 84 is a transparent substrate, 85 is a color filter, 86 is a transparent electrode, 87 is a liquid crystal layer, 88 is a mirror reflector, and 89 is a lower substrate.

Even in such constitution using the front scattering film as in prior art I, since the scattering angle region is omnidirectional, due to scattering of light by scattering film, the light is diffused also in the direction not visible from the viewer out of the exit light from the liquid crystal display device. Accordingly, the exit light is not utilized effectively, and sufficient brightness is not obtained in white display in the viewer's observing direction, and the contrast is lowered. Usually, the main observing direction of the viewer is the normal direction of the liquid crystal display device, but the light is diffused in this direction when emitted from the scattering film, and the image appears to be blurry.

SUMMARY

It is hence a primary object of the invention to solve the problems in the prior arts, and present a reflective liquid crystal display device which is bright in white display, sufficiently dark in black display, high in contrast, small in dependence on angle of viewing field, and suppressed in blurriness of image.

A first reflective liquid crystal display device of the invention comprises a polarizer, a retardation film, a scattering film layer formed by laminating a plurality of front scattering films strong in front scattering characteristic and almost free from back scattering characteristic, and a liquid crystal cell having a mirror reflector, in which at least one of the front scattering films for forming the scattering film layer has its scattering angle range asymmetrical to the normal direction of the film. Therefore, by containing the front scattering film of which scattering angle range is asymmetrical, the scattering characteristic of light differs between input and output in and out of the reflective liquid crystal display device so as to diffuse in a specific direction, and the concentration of the reflected light to the viewer side is enhanced, and the reflectivity is heightened, so that black display of sufficiently low reflectivity and white display of high reflectivity are obtained, and a high contrast is realized in the reflective liquid crystal display device.

A second reflective liquid crystal display device of the invention comprises a polarizer, a retardation film, a scattering film layer formed by laminating a plurality of front scattering films, and a liquid crystal cell having a mirror reflector, in which all of the front scattering films for forming the scattering film layer have their scattering angle ranges asymmetrical to the normal direction of each film. Thus, since the scattering angle ranges of all front scattering films are asymmetrical, the scattering characteristic of light differs between input and output in and out of the reflective liquid crystal display device and the light can be controlled so as to diffuse in a specific direction only, the concentration of the reflected light to the viewer side is enhanced, and the reflectivity is heightened, so that black display of sufficiently low reflectivity and white display of high reflectivity are obtained, and a high contrast is realized in the reflective liquid crystal display device.

In the invention, in addition to the requirements in the first reflective liquid crystal display device, all of the front scattering films for forming the scattering film layer have the projection directions onto each film surface in the central angle direction of their scattering angle ranges in a range of 90° to 270° counterclockwise, on the basis of 0° of the azimuth in the sitting position direction of the viewer observing the reflective liquid crystal display device, whereby the object can be achieved effectively, and corresponding actions and effects are obtained at the same time.

Also in the invention, the projection directions onto each film surface in the central angle direction of their scattering angle ranges in the front scattering films in two out of the front scattering films for forming the scattering film layer form an angle range of 0° to 120° to each other, or two out of the front scattering films for forming the scattering film layer have the projection directions onto each film surface in the central angle direction of their scattering angle ranges crossing orthogonally to each other, or two out of the front scattering films for forming the scattering film layer have the projection directions onto each film surface in the central angle direction of their scattering angle ranges, at about 135° and 225° counterclockwise, on the basis of 0° of the azimuth in the sitting position direction of the viewer observing the reflective liquid crystal display device, or two out of the front scattering films have the projection directions onto each film surface in the central angle direction of their scattering angle ranges forming an angle of about 180° to each other, or at least one of the front scattering films has the projection direction onto the film surface in the central angle direction of its scattering angle range, at about 180° on the basis of 0° of the azimuth in the sitting position direction of the viewer observing the reflective liquid crystal display device, whereby the object can be achieved effectively by these constitutions, and characteristic actions and effects are obtained individually.

A third reflective liquid crystal display device of the invention comprises a liquid crystal cell having liquid crystal charged between a pair of substrates, a polarizer disposed at the side of one substrate of the liquid crystal cell, a retardation film disposed between this polarizer and the liquid crystal cell, a scattering film layer disposed at the side of the one substrate, and a mirror reflector disposed at the side of other substrate of the liquid crystal cell, in which the scattering film layer has an incident angle region for scattering the transmission light more strongly than the incidence from the film layer normal direction.

In this constitution, a favorable monochromatic display is possible, and a high contrast is obtained, thereby presenting a reflective liquid crystal display device capable of obtaining a clear image, without blurry image in the normal direction of the reflective liquid crystal display device or the main observing direction of the viewer.

A fourth reflective liquid crystal display device comprising a liquid crystal cell having liquid crystal charged between a pair of substrates, a polarizer disposed at the side of one substrate of the liquid crystal cell, a retardation film disposed between this polarizer and the liquid crystal cell, a scattering film layer disposed at the side of the one substrate, and a light reflecting means disposed at the side of other substrate of the liquid crystal cell, in which the scattering film layer includes a scattering film for scattering the transmission light from a second incident angle region not including the film normal direction more strongly than the transmission light from a first incident angle region including the film normal direction.

In this constitution, too, a favorable monochromatic display is possible, and a high contrast is obtained, thereby presenting a reflective liquid crystal display device capable of obtaining a clear image, without blurry image in the normal direction of the reflective liquid crystal display device or the main observing direction of the viewer.

In the fourth reflective liquid crystal display device, the scattering characteristic of the transmission light from the first incident angle region and the scattering characteristic of the transmission light from the second incident angle region differ by 45% or more as expressed by the haze rate.

Herein, the haze rate is the value defined as (scattering light transmissivity)/(total light transmissivity)×100 [%].

Preferably, the scattering characteristic of the transmission light from the first incident angle region should be 20% or less as expressed by the haze rate. According to this preferred example, the blurry image in the normal direction of the reflective liquid crystal display device or the main observing direction of the viewer can be suppressed more effectively. From the same viewpoint, the haze rate of the transmission light from the first incident angle region is preferred to be 10% or less.

Preferably, the scattering characteristic of the transmission light from the second incident angle region should be 50% or more as expressed by the haze rate. According to this preferred example, a white display of a further higher reflectivity can be obtained by effectively concentrating the incident light from the angle direction other than the main observing direction into main observing direction. From the same viewpoint, the haze rate of the transmission light from the second incident angle region is preferred to be 60% or more.

Preferably, the second incident angle region should be in a range of $5° \leq \theta \leq 90°$, in terms of the angle $\theta$ formed by the incident light direction into the scattering film and the film normal ($0° \leq \theta \leq 90°$). This preferred example can present a favorable picture quality suppressed in blurry image for the observer in the region of at least $0° \leq \theta < 5°$. From the same viewpoint, the second incident angle region is further preferred to be in a range of $10° \leq \theta \leq 90°$.

Preferably, $\Delta\theta$ or the difference between the maximum value and minimum value of $\theta$ above should be in a range of $\Delta\theta \geq 30°$. According to this preferred example, the incident light from the second incident angle region maintained over a specific range can be effectively concentrated in the main observing direction. From the same viewpoint, it is further preferred to be $\Delta\theta \geq 50°$.

Preferably, it should be in a range of $90° \leq \phi \leq 270°$, as expressed by the angle $\phi$ formed by the projection component on the film surface in the incident light direction corresponding to the second incident angle region of the scattering film with the reference azimuth in the film surface ($0° \leq \phi < 360°$). Herein, the reference azimuth in the film surface coincides with the sitting position direction of the viewer observing the reflective liquid crystal display device.

Preferably, the scattering film layer should include two or more scattering films laminated so that the second incident angle regions may not be identical. According to this preferred example, the incident light from other angle direction than the main observing direction can be more effectively concentrated.

Preferably, when laminating two or more scattering films, it should be laminated so that the second incident angle region may be in a range of $60° \leq \phi \leq 300°$, more preferably in a range of $90° \leq \phi \leq 270°$. According to this preferred example, at least, for the viewer in the range of $0° \leq \phi < 90°$ and $270° < \phi < 360°$, a bright and excellent picture quality suppressed in image blurriness can be presented.

In this case, $\phi$ is the angle formed by the projection component on the film layer surface in the incident light direction corresponding to the second incident angle region of the scattering film layer with the sitting position direction of the viewer ($0° \leq \phi < 360°$).

The scattering films used in the third and fourth reflective liquid crystal display devices of the invention are preferred to be front scattering films. More specifically, the front scattering films refer to scattering films having front scattering characteristics, hardly having back scattering characteristics. In the front scattering films, the total light transmissivity is preferred to be 90% or more.

DESCRIPTION OF THE PREFERRED EMBODIMENTS

Referring now to FIG. 1 through FIG. 12, representative embodiments of the invention are described below in order to obtain better understanding of the technical aspects of the invention, in particular, the problems to be solved as mentioned above and means of solving them.

Embodiment 1

Figure 1:
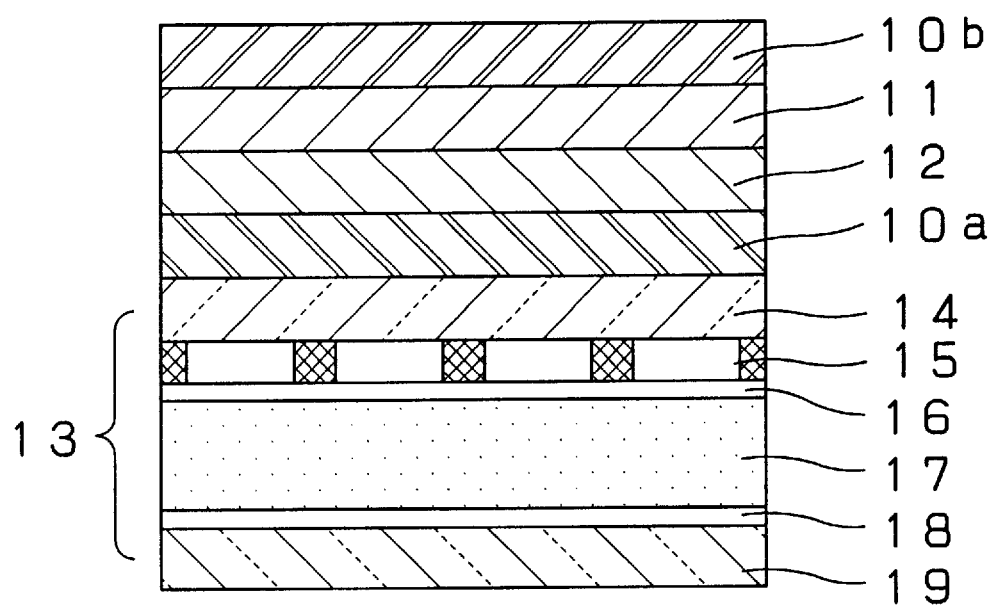
FIG. 1 is a sectional view of a reflective liquid crystal display device in embodiment 1 of the invention.
Figure 2:
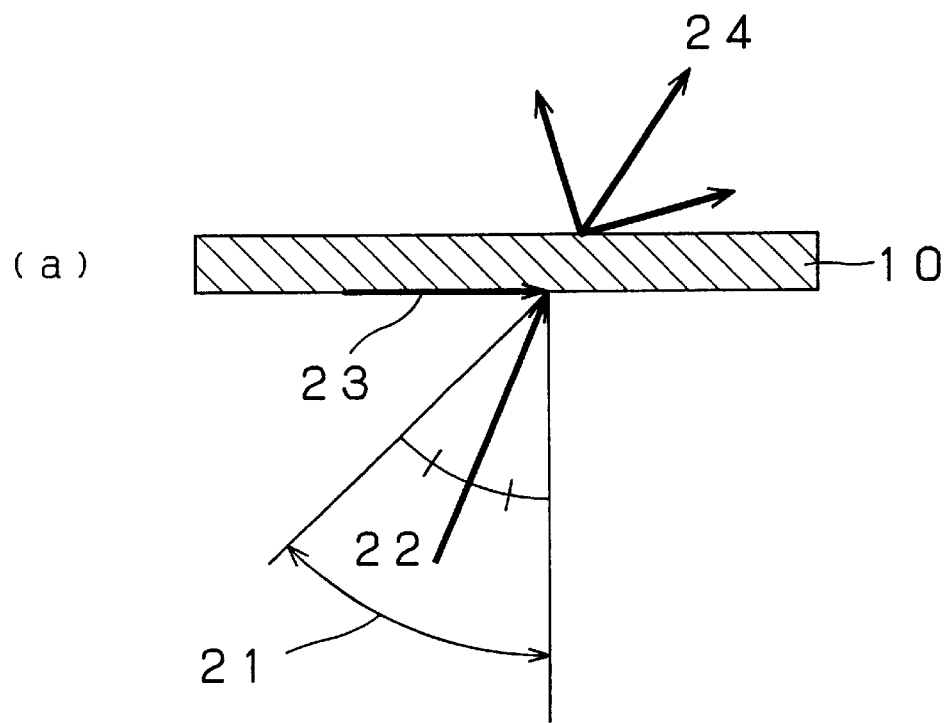
FIG. 2 (a) is a conceptual view showing a scattering angle direction when seeing one front scattering film from a side, and (b) is a conceptual view showing a scattering angle direction of front scattering film when seeing from above the reflective liquid crystal display device using one front scattering film.
Figure 2:
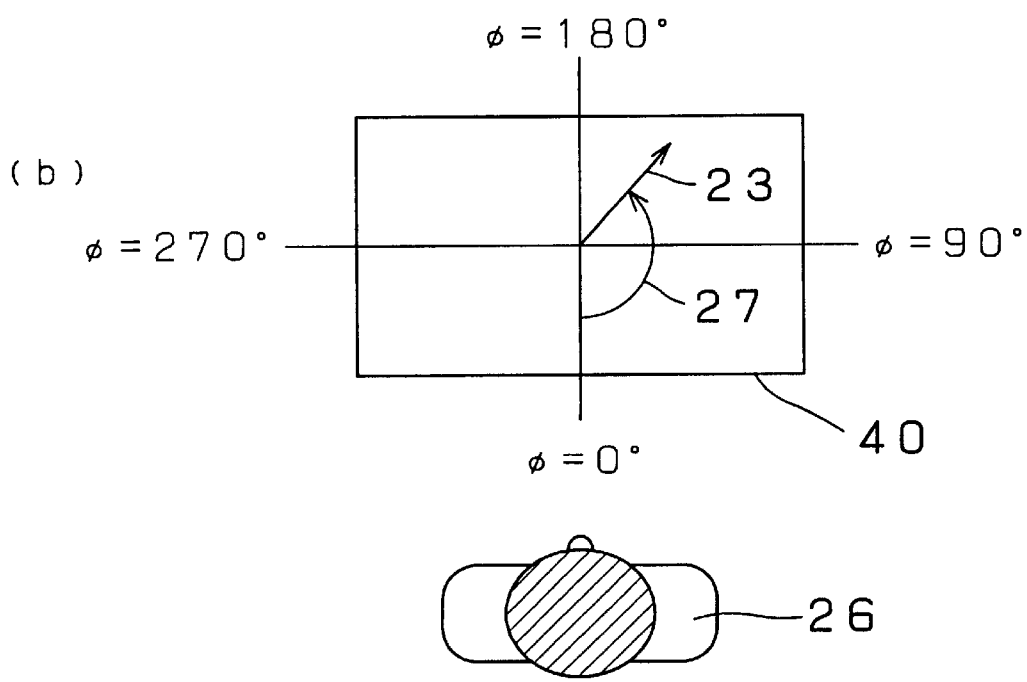

First, embodiment 1 is described by referring to a sectional view of a reflective liquid crystal display device in FIG. 1 and conceptual diagrams showing the scattering angle direction of front scattering film in FIG. 2 (a) and FIG. 2 (b).

FIG. 1 is a sectional view of the reflective liquid crystal display device in embodiment 1 of the invention. In FIG. 1, reference numeral 10a is a front scattering film (layer) of which scattering angle range is asymmetrical to the normal direction of film, 10b is a front scattering film (layer) of which scattering angle range is symmetrical to the normal direction of film, 11 is a polarizer, 12 is a retardation film layer, 13 is a liquid crystal cell, 14 is an upper transparent substrate, 15 is a color filter, 16 is a transparent electrode, 17 is a liquid crystal layer, 18 is a mirror reflector, and 19 is a lower substrate.

FIG. 2 (a) is a conceptual view showing a scattering angle direction when seeing one front scattering film from a side. Reference numeral 10 is a front scattering film, 21 is a scattering angle range showing the range of incident angle of light scattered by the film out of the incident light into the front scattering film, 22 is a central angle direction showing the central angle of the scattering angle range, 23 is a projection direction onto the scattering film surface in the central angle direction, and 24 shows a front scattering light. The light entering the front scattering film from other angle than the scattering angle range 21 is hardly scattered, but passes straightly forward.

FIG. 2 (b) is a conceptual view showing a scattering angle direction of front scattering film when seeing from above the reflective liquid crystal display device using one front scattering film. Reference numeral 23 is a projection direction onto the film surface in the central angle direction in the scattering angle range of the front scattering film, 40 is a reflective liquid crystal display device, 26 is a viewer, and 27 is an azimuth φ. The azimuth φ is the angle measured from the reference azimuth in the film surface, and this reference azimuth coincides with the sitting position direction of the viewer 26 observing the liquid crystal display device. The liquid crystal display device is designed by assuming the sitting position direction of the viewer.

Back to FIG. 1, using glass substrates as the upper transparent substrate 14 and lower substrate 19, a pigment-dispersed color filter 15 of red, green and blue stripes was formed on the upper transparent substrate 14 by photolithography, and a pixel electrode was formed thereon as the transparent electrode 16 by using indium tin oxide (ITO). On the lower substrate 19, by evaporating silver, the mirror reflector 18 was formed to obtain a metal reflective electrode.

On the transparent electrode 16 and mirror reflector 18, a 5 wt. % polyimide solution in N-methyl-2-pyrrolidinone was printed, and cured at 200° C., and aligned by rotary rubbing method by using rayon cloth so that rubbing may be antiparallel to each other, and an alignment film was formed.

In the circumferential area on the upper transparent electrode 14, a thermosetting seal resin mixing 1.0 wt. % of glass fiber of 5.7 micron in diameter was printed, and resin beads of 4.5 microns in diameter were sprinkled on the lower substrate 19 at a rate of 200 beads/mm$^2$, and the upper transparent substrate 14 and lower substrate 19 were adhered to each other, and the seal resin was cured at temperature of 150° C. Then, ester nematic liquid crystal of double refractive index difference Δn=0.14 was injected in vacuum, it was sealed with ultraviolet ray curing resin, and cured by irradiation with ultraviolet rays.

On the upper transparent substrate 14 of thus formed liquid crystal cell 13, as the scattering film 10a of which scattering angle range is asymmetrical to the normal direction of the film, a front scattering film (trade name Lumisty) of Sumitomo Chemical Corp. with scattering angle range 21 of 0° to 50° as measured from the film normal was adhered so that the projection direction 23 on the film surface in central angle direction 22, that is, 25°, of the scattering angle range 21 would be an opposite direction to the direction of the viewer 26 of the reflective liquid crystal display device 40, that is, the azimuth 27 would be φ=180°. Thereon, as the retardation film layer 12, one of retardation value of 490 nm was adhered so that the optical slow axis would be orthogonal to the rubbing direction of the upper transparent substrate 14, and further thereon, as the polarizer 11, a neutral gray polarizer (SQ1852AP of Sumitomo Chemical Corp.) was adhered so that its absorption axis would form an angle of 45° with the rubbing direction of the upper transparent substrate 14. Thereon, as the scattering film 10b of which scattering angle range is symmetrical to the film normal direction, one having the haze rate of 10% in the total incident angle direction was adhered.

Thus was obtained the reflective color liquid crystal display device in normally black mode which is in black display while no voltage is applied. In this liquid crystal display device, which uses the front scattering film of which scattering angle range is asymmetrical to the normal direction of the scattering film, the exit light from the display device is diffused in a specific direction only, and therefore the surrounding light can be utilized effectively, and measured in the front direction, a contrast of 6.4 and a reflectivity of 12.7% were obtained. Herein, the contrast measured in the front direction was measured by input of light at an incident angle θ=30° from ahead of the viewer. The reflectivity mentioned in the specification refers to the brightness when white is displayed in the liquid crystal display device, assuming the reflectivity of standard white plate as 100%, being expressed by converting into the value of Y in XYZ colorimetric system.

In this embodiment, the front scattering films of which scattering angle range is 0° to 50° were used, but the invention is not limited to them alone, but, for example, same effects are obtained by using those having the scattering angle range of 10° to 60°.

Embodiment 2

Figure 3:
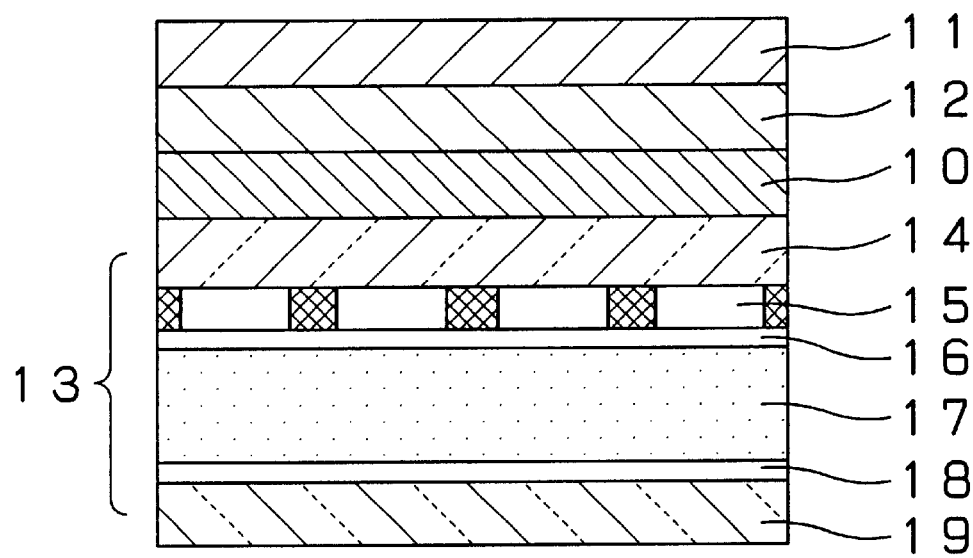
FIG. 3 is a sectional view of a reflective liquid crystal display device in embodiment 2 of the invention.

Embodiment 2 of the invention is described by referring to FIG. 3 which is a sectional view showing a basic constitution of the reflective liquid crystal display device, and FIG. 2 conceptually showing the scattering angle direction of the front scattering film.

In FIG. 3, reference numeral 10 is a front scattering film layer of which scattering angle range is asymmetrical to the normal direction of film, 11 is a polarizer, 12 is a retardation film layer, 13 is a liquid crystal cell, 14 is an upper transparent substrate, 15 is a color filter, 16 is a transparent electrode, 17 is a liquid crystal layer, 18 is a mirror reflector, and 19 is a lower substrate.

The structure and manufacturing method of the liquid crystal cell of the embodiment are basically same as in embodiment 1. On the upper transparent substrate 14 of the liquid crystal cell 13, as the scattering film 10 of which scattering angle range is asymmetrical to the normal direction of the film, a front scattering film (trade name Lumisty) of Sumitomo Chemical Corp. with scattering angle range 21 of 0° to 50° as measured from the film normal was adhered so that the projection direction 23 on the film surface in the central angle direction 22, that is, 25°, of the scattering angle range 21 would be an opposite direction to the direction of the viewer 26 of the reflective liquid crystal display device 40, that is, the azimuth 27 would be φ=180°, and further thereon one with scattering angle range of 10° to 60° was adhered so that the projection direction 23 on the film surface in the central angle direction 22, that is, 35°, would be φ=90°. Thereon, as the retardation film layer 12, one of retardation value of 490 nm was adhered so that the optical slow axis would be orthogonal to the rubbing direction of the upper transparent substrate 14, and further thereon, as the polarizer 11, a neutral gray polarizer (SQ1852AP of Sumitomo Chemical Corp.) processed by anti-glare (AG) treatment and anti-reflection treatment was adhered so that its absorption axis would form an angle of 45° with the rubbing direction of the upper transparent substrate 14.

In the reflective liquid crystal display device of the embodiment thus constituted, which uses the front scattering film of which scattering angle range is asymmetrical to the normal direction of the scattering film, the exit light from the reflective liquid crystal display device is diffused in a specific direction only, and therefore the surrounding light can be utilized effectively, and measured in the front direction, a contrast of 13.7 and a reflectivity of 12.80% were obtained.

In this embodiment, the front scattering films of which scattering angle range is 0° to 50°, and 10° to 60° were used, but the realization of the basic concept of the invention is not limited to them alone, but, for example, almost same effects are obtained by using those having the scattering angle range of 0° to 30°.

Embodiment 3

Figure 4:
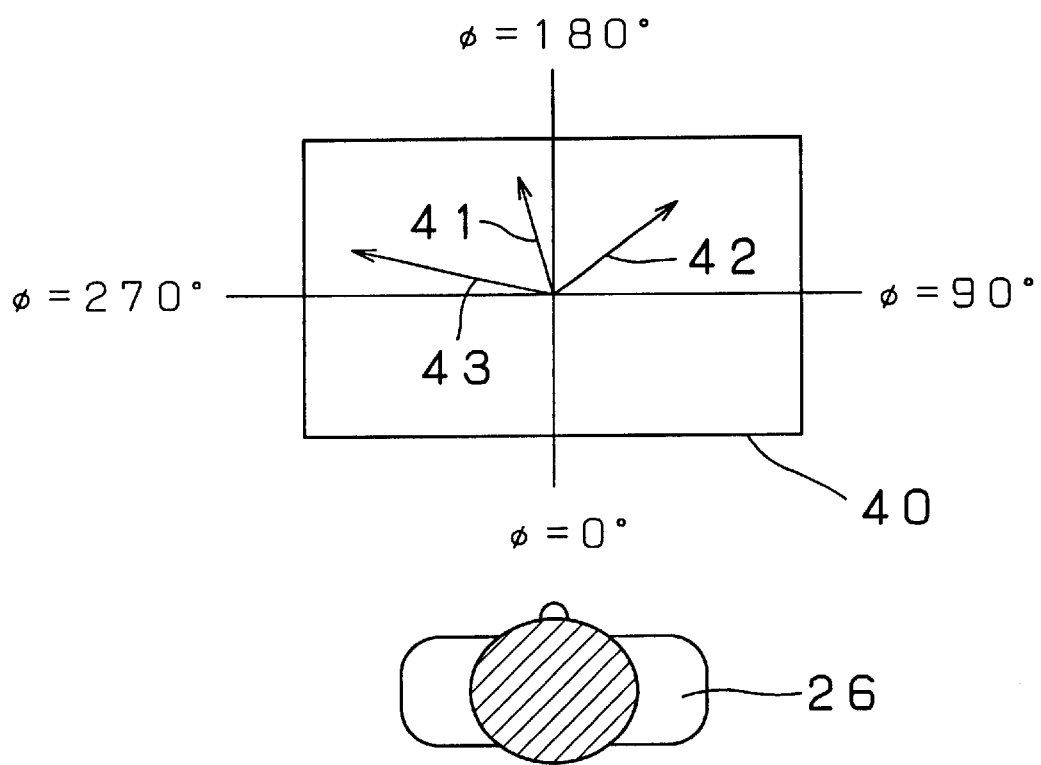
FIG. 4 is a conceptual view showing a scattering angle direction of front scattering film when seeing from above a reflective liquid crystal display device in embodiment 3 of the invention.

The structure and manufacturing method of a reflective liquid crystal display device in embodiment 3 of the invention are common to those in embodiment 1 and embodiment 2, and the following description is given by referring to the sectional view of the reflective liquid crystal display device in FIG. 1 and FIG. 3, the conceptual diagrams showing the scattering angle direction of front scattering film in FIGS. 2 (a), (b), and also FIG. 4.

FIG. 4 is a conceptual view showing a scattering angle direction when seeing from above the reflective liquid crystal display device using three front scattering films of which scattering angle range is asymmetrical to the normal direction of the film in embodiment 3 of the invention. In FIG. 4, reference numeral 40 is a reflective liquid crystal display device, 41, 42, 43 are projection directions onto the film surface in the central angle directions in the scattering angle range of front scattering films, and 26 is the viewer.

In this embodiment, as the front scattering film layer 10a (in FIG. 1) or front scattering film layer 10 (in FIG. 3) of which scattering angle range is asymmetrical to the normal direction of film, three front scattering films (trade name Lumisty) of Sumitomo Chemical Corp. were used, and one of which scattering angle range 21 shown in FIG. 2 is 0° to 50° as measured from the film normal was adhered so that the projection direction onto the film surface in the central angle direction, that is, 25°, of the scattering angle range would be 41, and the other two of which scattering angle range 21 is 10° to 60° as measured from the film normal were adhered in layers so that the projection direction onto the film surface in the central angle direction, that is, 35°, of the scattering angle range would be 42 and 43.

In the reflective liquid crystal display device of the embodiment thus constituted, by effectively utilizing the surrounding light, favorable monochromatic display is possible, and not only high contrast is realized, but also it was confirmed that blurry image was lessened because scattering does not occur when the light is emitted from the reflective liquid crystal display device to the direction of the viewer.

In this embodiment, the front scattering films of which scattering angle range is 0° to 50°, and 10° to 60° were used, but the realization of the basic concept of the invention is not limited to them alone, but, for example, almost same effects are obtained by using those having the scattering angle range of 0° to 30°.

Embodiment 4

Figure 5:
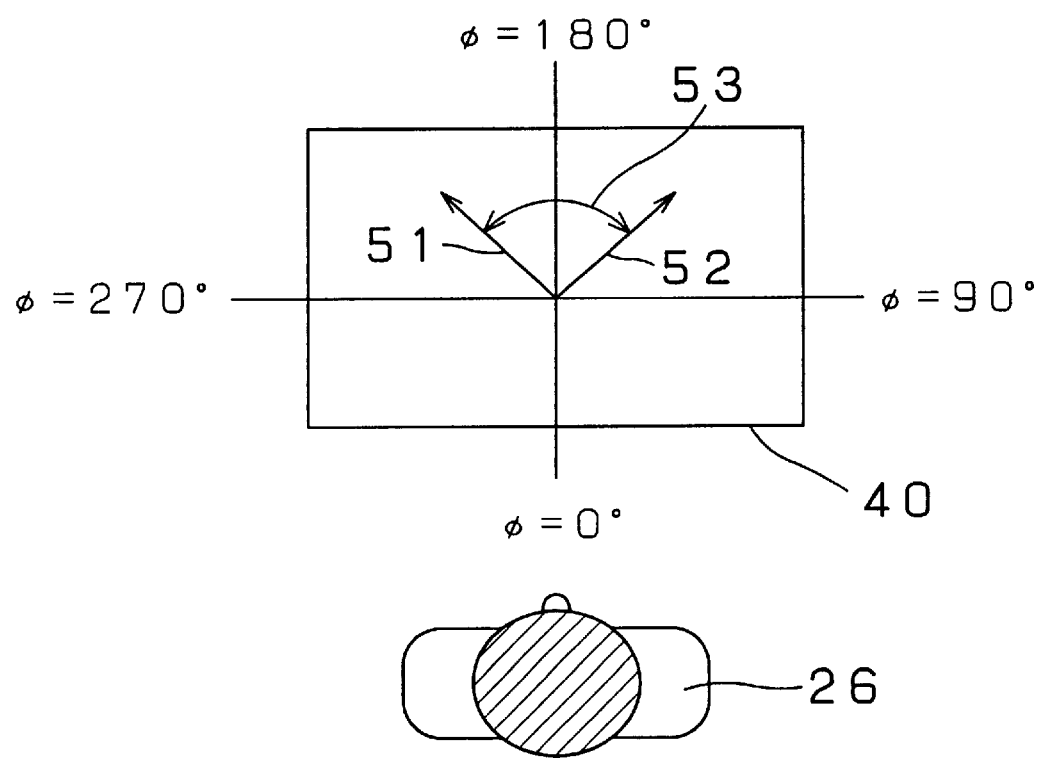
FIG. 5 is a conceptual view showing a scattering angle direction of front scattering film when seeing from above a reflective liquid crystal display device in embodiment 4 of the invention.

The structure and manufacturing method of a reflective liquid crystal display device in embodiment 4 of the invention are common to those in embodiment 1 and embodiment 2, and the following description is given by referring to the sectional view of the reflective liquid crystal display device in FIG. 1 and FIG. 3, the conceptual diagram showing the scattering angle direction of front scattering film in FIG. 2, and also FIG. 5.

FIG. 5 is a conceptual view showing a scattering angle direction of front scattering film layer when seeing from above the reflective liquid crystal display device in embodiment 4 of the invention using two front scattering films of which scattering angle range is asymmetrical to the normal direction of the film. In FIG. 5, reference numeral 40 is a reflective liquid crystal display device, 51, 52 are projection directions onto the film surface in the central angle direction in the scattering angle range of front scattering films, 53 is an angle formed by projection directions onto the film surface in the central angle direction in the scattering angle range of two films, and 26 is the viewer.

In this embodiment, as the front scattering film layer 10a (in FIG. 1) or front scattering film layer 10 (in FIG. 3) of which scattering angle range is asymmetrical to the normal direction of film, two front scattering films (trade name Lumisty) of Sumitomo Chemical Corp. were used, and those of which scattering angle range 21 is 0° to 50° as measured from the film normal were adhered so that the projection directions 51, 52 onto the film surface in the central angle directions, that is, 25°, of the scattering angle range would be respectively azimuth φ=225° and φ=135°. In the embodiment thus constituted, which uses the front scattering films of which scattering angle range is asymmetrical to the normal direction of the scattering films, the exit light from the reflective liquid crystal display device is diffused in a specific direction only, and therefore the surrounding light can be utilized effectively, and measured in the front direction, a contrast of 8.7 and a reflectivity of 12.29% were obtained. In the lateral direction, too, a contrast of 10.5 was obtained (the contrast as measured by input of light at incident angle θ=30° from the lateral direction of the viewer). In this constitution, a favorable monochromatic display is possible in multiple directions, a high contrast is obtained, and characteristics of natural angle of viewing field are realized.

Figure 6:
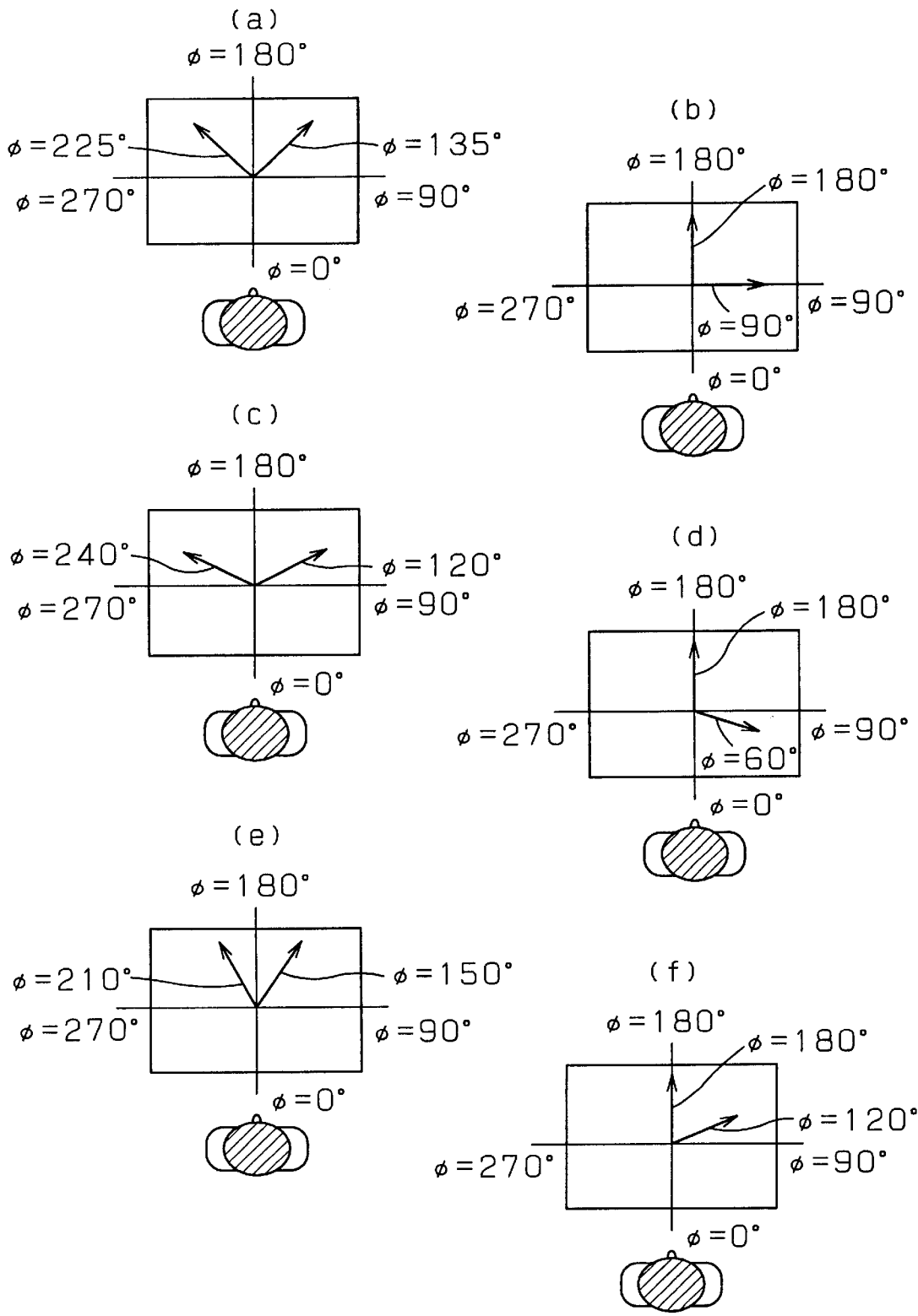
FIGS. 6(a)–(f) are diagrams showing a scattering angle direction of front scattering film (in the case of 0° to 120°) when seeing from above the scattering film layer of the reflective liquid crystal display device in embodiment 4 of the invention.

When the angle 53 formed by the projection directions onto the film surface in the central angle direction 22 of the scattering angle range 21 of two front scattering films is in a range of 0° to 120°, favorable monochromatic display is possible not only in one direction, but also in multiple directions, and a high contrast was confirmed. In particular, a favorable characteristic was confirmed when the projection directions of the two front scattering films onto each film surface in the central angle direction in each scattering angle range cross each other orthogonally. Representative examples of this constitution are shown in FIGS. 6 (a) through (f).

Figure 7:
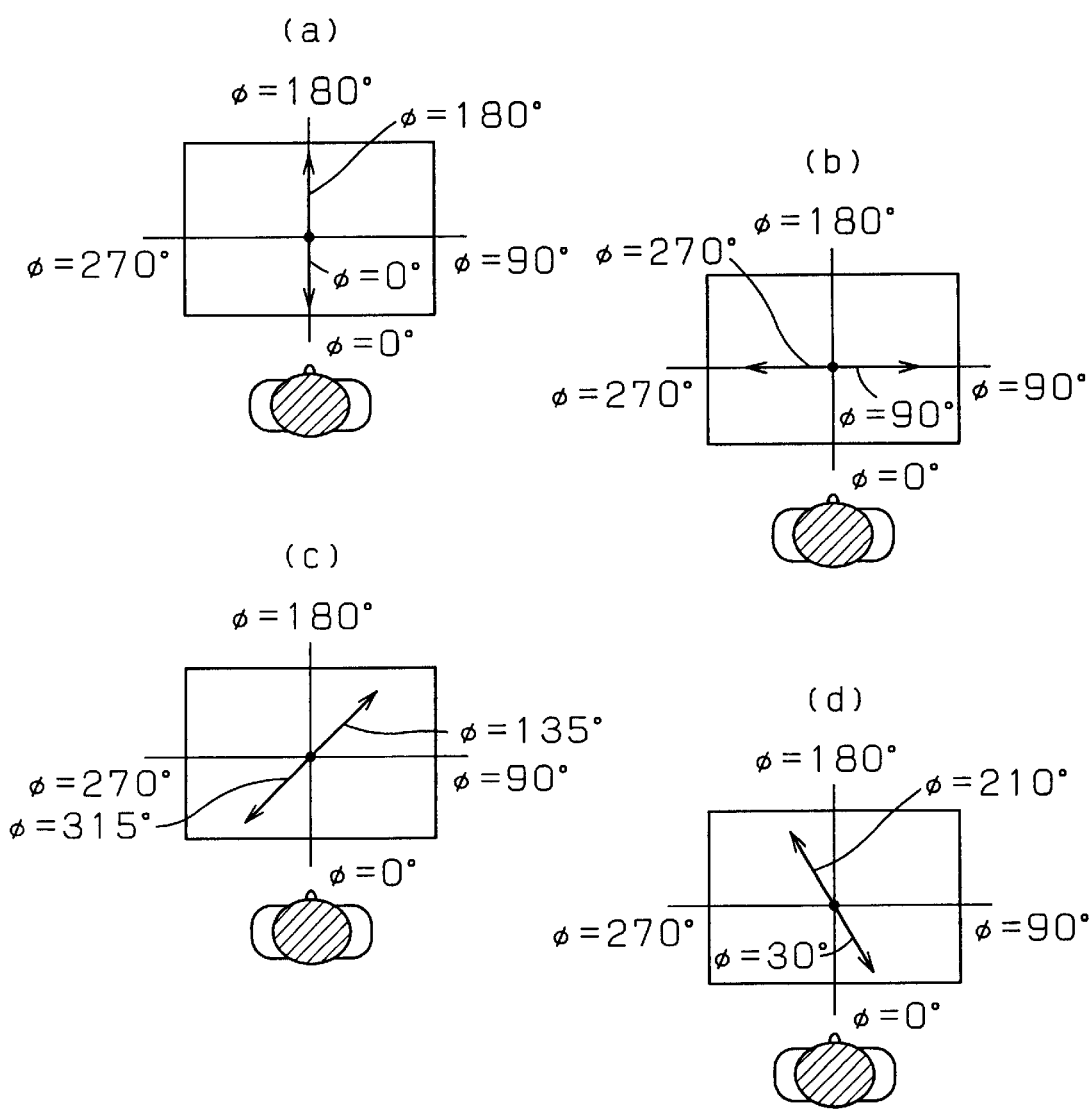
FIGS. 7(a)–(d) are diagrams showing a scattering angle direction of front scattering film (in an antiparallel case) when seeing from above the scattering film layer of the reflective liquid crystal display device in embodiment 4 of the invention.

A further study was made into a case in which the angle 53 formed by the projection directions onto the film surface in the central angle direction 22 of the scattering angle range 21 of two front scattering films is antiparallel. That is, two films of which scattering angle range 21 is 0° to 50° as measured from the film normal were adhered together so that the projection directions 51, 52 onto the film surface would be respectively azimuth φ=0° and φ=180°. In the characteristic measured in a direction inclined by 10° from the front (normal direction), at both azimuth φ=0° and 180°, a contrast of 11.7 and a reflectivity of 13.30% were obtained. Not limited to the direction of normal angle of viewing field, but also in the opposite direction, favorable monochromatic display was possible and a high contrast was confirmed. Representative examples of this constitution are shown in FIGS. 7 (a) through (d).

Incidentally, when the angle formed by the projection direction onto the film surface in the central angle direction 22 in the scattering angle range 21 in one of the plural front scattering films is the azimuth φ=180°, the reflectivity was 13.30% in the case of antiparallel configuration, but in the scattering angle range 21 of 0° to 50°, when the angle 53 formed by the projection direction onto, the film surface is antiparallel, respectively at azimuth φ=30° and φ=210°, the reflectivity was 12.78%. That is, the characteristic in the direction of azimuth φ=0° is confirmed to be excellent by constituting so that the projection direction onto the film surface in the central angle direction 22 of the scattering angle range 21 of the front scattering film would be azimuth φ=180°.

In this embodiment, the front scattering films of which scattering angle range is 0° to 50° were used, but not limited thereto, for realizing the basic concept of the invention and obtaining desired effects, by using, for example, those having the scattering angle range of 10° to 60°, substantially similar effects can be obtained.

Embodiment 5

Figure 8:
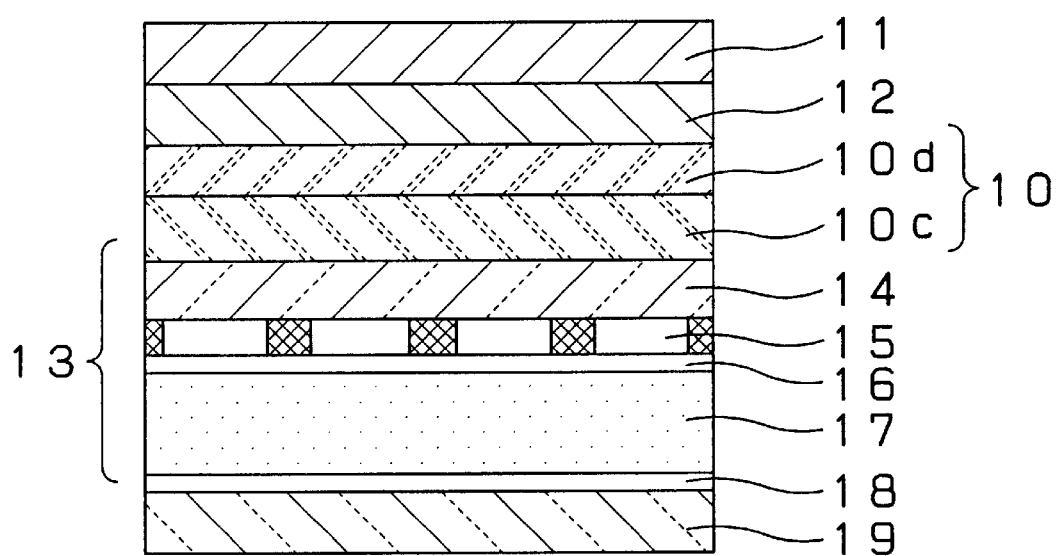
FIG. 8 is a is a sectional view showing constitution of examples of reflective liquid crystal display device in embodiments 5 to 7 of the invention.

FIG. 8 is a sectional view showing a reflective liquid crystal display device in embodiment 5 of the invention. In FIG. 8, reference numeral 10 is a front scattering film layer composed of a front scattering film 10c and a second scattering film 10d, 11 is a polarizer, 12 is a retardation film layer, 13 is a liquid crystal cell, 14 is an upper transparent substrate, 15 is a color filter, 16 is a transparent electrode, 17 is a liquid crystal layer, 18 is a mirror reflector (metal reflective electrode), and 19 is a lower substrate.

Figure 9:
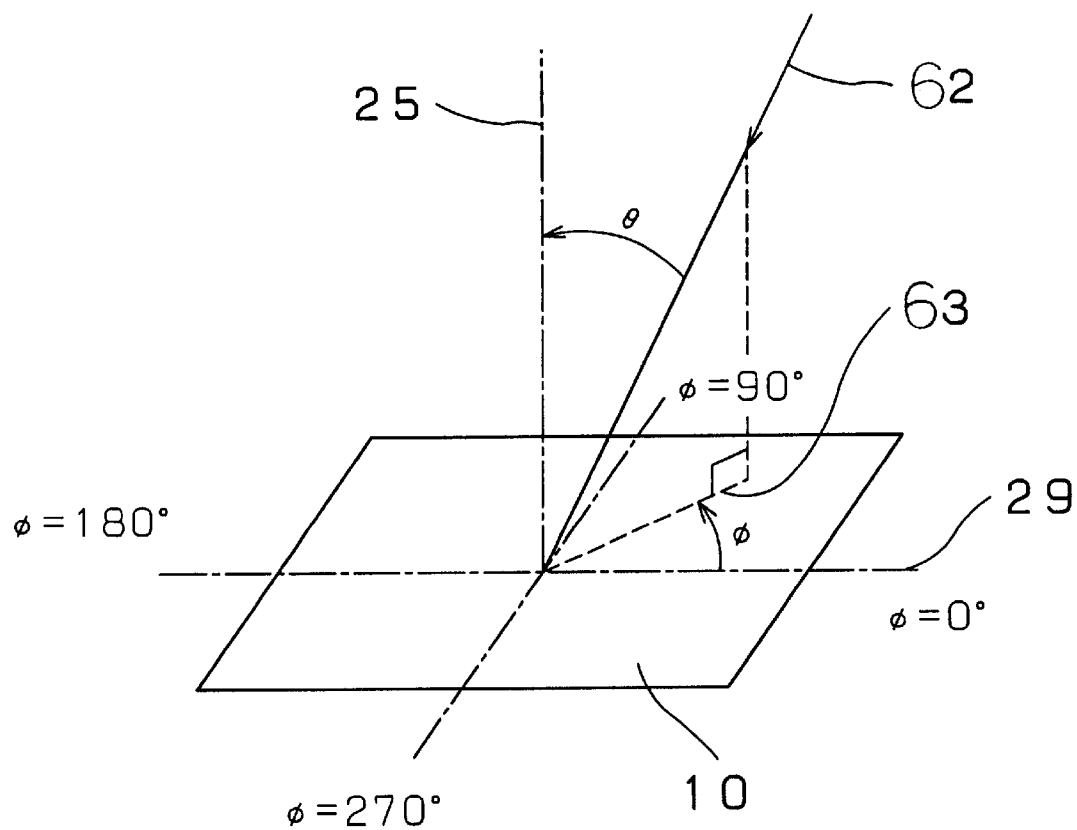
FIG. 9 is a perspective view of scattering film for explaining the definition of angle of incident light into the scattering film as a constituent element of the reflective liquid crystal display devices in embodiments 5 to 7 of the invention.
Figure 10:
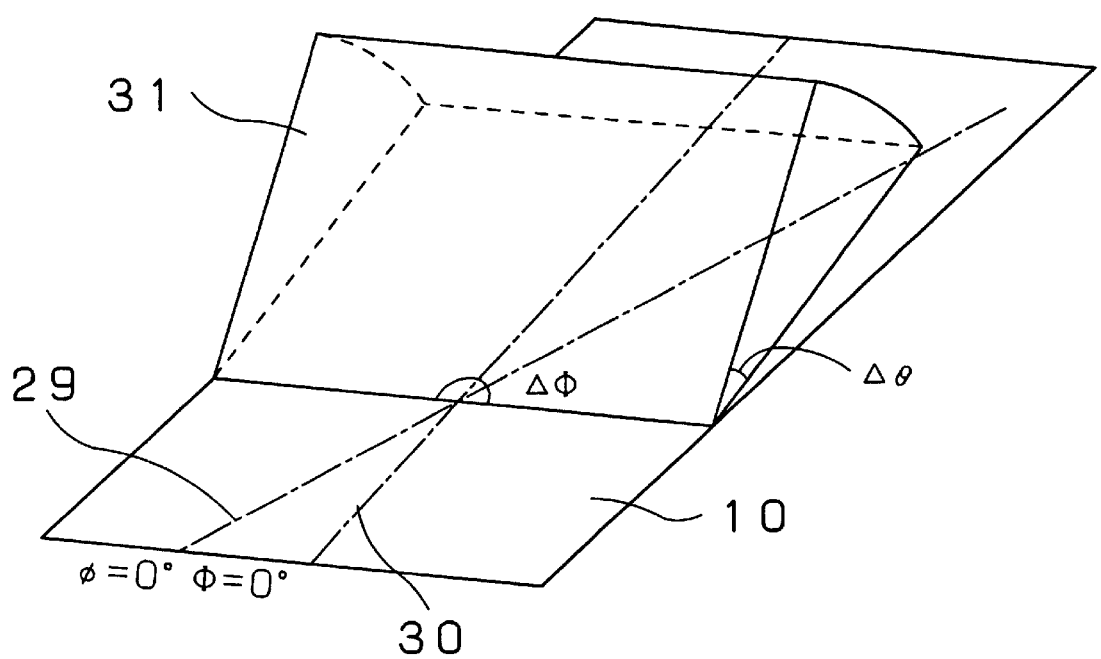
FIG. 10 is a perspective view of scattering film for explaining an example of scattering range of scattering film.

FIG. 9 is a conceptual view for defining the angle of incident light into the front scattering film, in which reference numeral 10 is a front scattering film, 62 is an incident light direction into the front scattering film, 25 is a normal direction of the front scattering film, and 29 is a reference azimuth in film surface. As shown in the diagram, angle θ is the angle formed by the incident light direction 62 and film normal direction 25, and angle φ is the angle formed by the reference azimuth in film surface 29, and projection component 63 onto the film surface of the incident light direction 62. In this case, the reference azimuth in film surface is adjusted to the sitting position direction of the viewer observing the liquid crystal display device.

The incident angle region (scattering range) of the front scattering film for scattering strongly only the incident light from a specific incident angle region is indicated by angles θ and φ. Besides, the area of the scattering range is indicated by Δθ and Δφ.

When laminating a plurality of scattering films, it is preferred to laminate so that the individual scattering ranges may not be identical. In an example of lamination shown in FIG. 10, plural scattering films identical in θ and Δφ, with Δφ≦90° are laminated so that the reference azimuth in the film surface 29 may be deviated, and the scattering range 31 is set in the azimuth indicated by 90°≦φ≦270°(Δφ=180°). Herein, the angle φ is indicated on the basis of the azimuth 30 of the sitting position of the viewer. That is, the azimuth of the setting position of the viewer is φ=0. The scattering range is preferred to be set within the range 31 of $90° \leq \phi \leq 270°$ shown in FIG. 10.

Using glass substrates as the upper transparent substrate 14 and lower substrate 19, a pigment-dispersed color filter 15 of red, green and blue stripes was formed on the upper transparent substrate 14 by photolithography, and a pixel electrode was formed thereon as the transparent electrode 16 by using indium tin oxide (ITO). On the lower substrate 19, by evaporating silver, a metal reflective electrode was formed as the mirror reflector 18. On the transparent electrode 16 and metal reflective electrode 18, a 5 wt. % polyimide solution in N-methyl-2-pyrrolidinone was printed, and cured at 200°°C., and aligned by rubbing method by using rayon cloth so that rubbing may be antiparallel to each other, and a pair of alignment films were formed.

In the circumferential area on the upper transparent electrode 14, a thermosetting seal resin mixing 1.0 wt. % of glass fiber of 5.7 micron in diameter was printed, and resin beads of 4.5 microns in diameter were sprinkled on the lower substrate 19 at a rate of 200 beads/mm², and the upper transparent substrate 14 and lower substrate 19 were adhered to each other, and the seal resin was cured at 150° C. Then, ester nematic liquid crystal of double refractive index difference Δn=0.14 was injected in vacuum, and it was sealed with ultraviolet ray curing resin, and cured by ultraviolet rays.

On the upper transparent substrate 14 of thus formed liquid crystal cell 13, as the scattering film 10c, a front scattering film (trade name Lumisty of Sumitomo Chemical Corp.), with the haze rate of 60% or more to the incident light 62 from the range of $10° \leq \theta \leq 60°$ (Δθ=50°) and the haze rate of 10% or less as for the incident light from other region including the film normal direction, was adhered so that the principal scattering azimuth where the haze rate is 60% would be φ=90°. Herein, the principal scattering azimuth refers to the central azimuth of the region in which the haze rate is 60% or more.

Further, on this film 10c, as the front scattering film layer 10d, similarly, a film, Lumisty, with the haze rate of 60% or more to the incident light 62 from the range of $0° \leq \theta \leq 50°$ (Δθ=50°), and the haze rate of 10% or less as for the incident light from other region, was adhered so that the principal scattering azimuth where the haze rate is 60% or more would be φ=180°.

The total ray transmissivity of the Lumisty was 95%.

Thereon, as the retardation film layer 12, one of retardation value of 490 nm was adhered so that the optical slow axis would be orthogonal to the rubbing direction of the upper transparent substrate 14, and further thereon, as the polarizer 11, a neutral gray polarizer (SQ1852AP of Sumitomo Chemical Corp.) was adhered so that its absorption axis would form an angle of 45° with the rubbing direction of the upper transparent substrate 14.

Thus was obtained the reflective color liquid crystal display device in normally black mode which is in black display while no voltage is applied. In this reflective liquid crystal display device, which uses at least one front scattering film with the scattering range not containing the normal direction of the scattering film layer 10, diffusion of exit light into the normal direction which is the principal observing direction of the viewer is weakened and the blurry image is lessened, while a high white display reflectivity can be obtained by utilizing the strong diffusion of the incident light from other direction. Moreover, since this scattering film is almost free from back scattering characteristic, a low black display reflectivity is also realized, and a reflective liquid crystal display device of high contrast can be obtained.

In such reflective liquid crystal display device, specifically, measured in the front direction, favorable display characteristics with a contrast of 13.7 and a reflectivity of 12.8% were obtained. It was also confirmed that the blurry image was particularly lessened in the region of $0° \leq \theta \leq 5°$.

By way of comparison, also as the front scattering film layer 10c, Lumisty of $0° \leq \theta \leq 50°$ used in the front scattering film 10d was used, that is, the reflective liquid crystal display device in the constitution using only the front scattering film with the haze rate to the incident light from the normal direction of the film of more than the specified value was similarly manufactured, but sharp image as in the embodiment was not obtained.

Moreover, as the front scattering film 10c, by using films of which scattering range having the haze rate of 60% or more to the incident light is individually $5° \leq \theta \leq 55°$, $8° \leq \theta \leq 58°$, $15° \leq \theta \leq 65°$, and $20° \leq \theta \leq 70°$, reflective liquid crystal display devices were fabricated and observed, and it was confirmed, as the scattering range was remoter from the normal direction, that sharper images were obtained as the blurry image became more and more insignificant in the principal observing direction, that is, the normal direction of the reflective liquid crystal display device.

Embodiment 6

The structure and manufacturing method of a liquid crystal display device of embodiment 6 are basically same as in embodiment 5, and the sectional structure is similar to the structure shown in FIG. 8.

In this embodiment, however, as the front scattering film layer 10, two front scattering films (tradename Lumisty) of Sumitomo Chemical Corp., with a haze rate of 60% or more to the incident light 62 from a range of $10 \leq \theta \leq 60°$ (Δθ=50°), and with a haze rate of 10% or less as for the incident light from other region including the film normal direction, were adhered so that the principal scattering azimuth in the range of haze rate of 60% or more should be respectively φ=90° and φ=180°.

Thereon, same as in embodiment 5, a retardation film layer 12 and a polarizer 11 were adhered sequentially.

Thus was obtained the reflective color liquid crystal display device in normally black mode which is in black display while no voltage is applied. In this reflective liquid crystal display device, which laminates front scattering films not containing the normal direction of the scattering film layer 10 in the scattering range, diffusion of exit light into the normal direction which is the principal observing direction of the viewer is weakened and the blurry image is lessened, while a high white display reflectivity can be obtained by utilizing the strong diffusion of the incident light from other direction. Moreover, since this scattering films are almost free from back scattering characteristic, a low black display reflectivity is also realized, and a reflective liquid crystal display device of high contrast can be obtained.

In such reflective liquid crystal display device, specifically, measured in the front direction, favorable display characteristics with a contrast of 12.1 and a reflectivity of 13.1% were obtained. It was also confirmed that the blurry image was particularly lessened in the region of $0° \leq \theta \leq 5°$.

Moreover, as the front scattering film 10c, by using films of which scattering range having the haze rate of 60% or more to the incident light is individually $5°≦θ≦55°$, $8°≦θ≦58°$, $15°≦θ≦65°$, and $20°≦θ≦70°$, reflective liquid crystal display devices were fabricated and observed, and it was confirmed, as the scattering angle region was remoter from the normal direction, that sharper images were obtained as the blurry image became more and more insignificant in the principal observing direction, that is, the normal direction of the reflective liquid crystal display device.

Embodiment 7

The structure and manufacturing method of a liquid crystal display device of embodiment 7 are basically same as in embodiment 5, and the sectional structure is similar to the structure shown in FIG. 8.

In this embodiment, however, as the front scattering film layer 10, two front scattering films (trade name Lumisty) of Sumitomo Chemical Corp., with a haze rate of 60% or more to the incident light 62 from a range of $10°≦θ≦60°$ ($Δθ=50°$), and with a haze rate of 10% or less as for the incident light from other region including the film normal direction, were adhered so that the principal scattering azimuth in the range of haze rate of 60% or more should be respectively $φ=150°$ and $θ=210°$.

Thereon, same as in embodiment 5, a retardation film layer 12 and a polarizer 11 were adhered sequentially.

Figure 11:
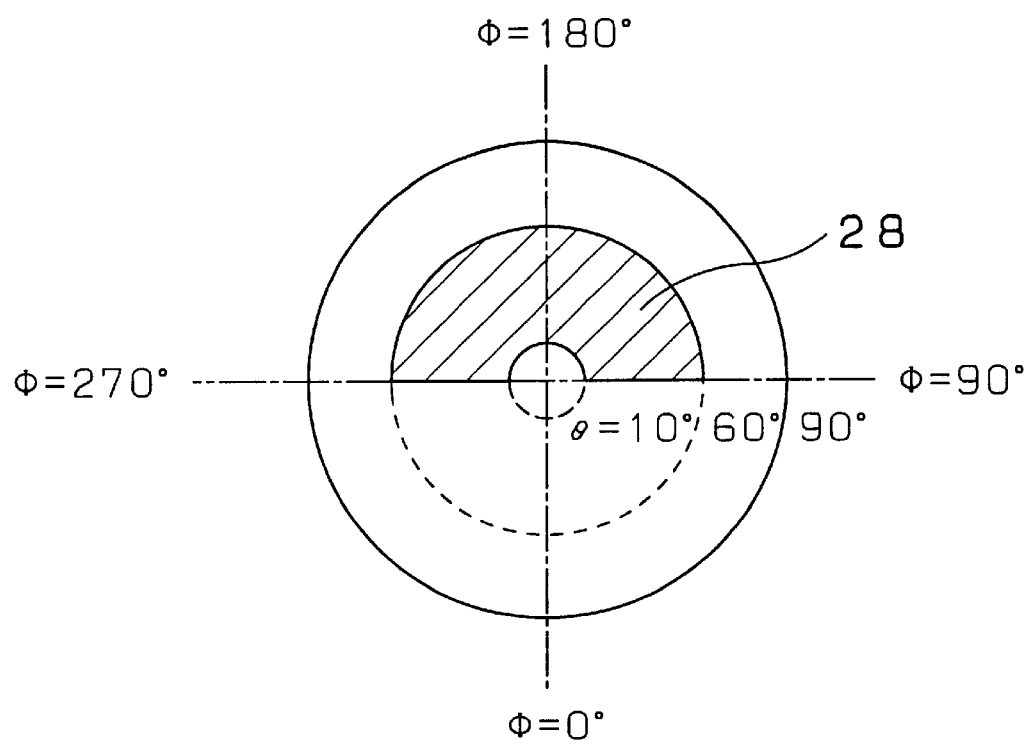
FIG. 11 is a plan view of scattering film for explaining an example of scattering azimuth of scattering film.
Figure 11:
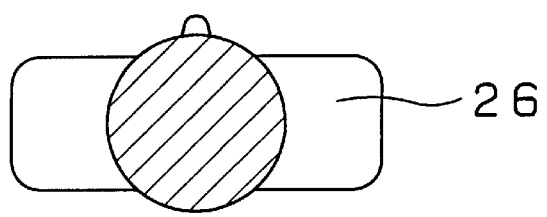

By the two front scattering films, the range of the haze rate of 60% or more is, as shown in FIG. 11, the range 28 of $10°≦θ≦60°$, $90°≦φ≦270°$.

In such reflective liquid crystal display device, specifically, measured in the front direction, a contrast of 11.5 and a reflectivity of 14.6% were obtained, and moreover, in a wide range, blurry image was eliminated, and a very sharp image was obtained.

Figure 12:
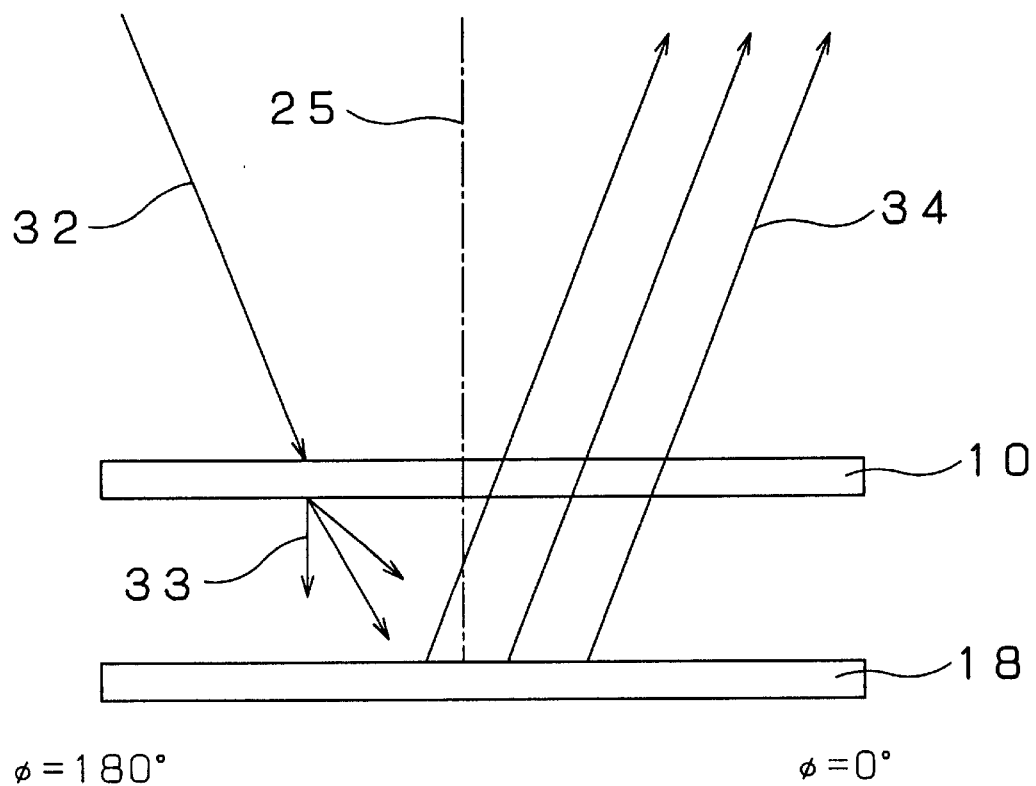
FIG. 12 is a conceptual sectional view of a liquid crystal display device for explaining scattering characteristics of incident light and reflected light in a reflective liquid crystal display device of the invention.
Figure 13:
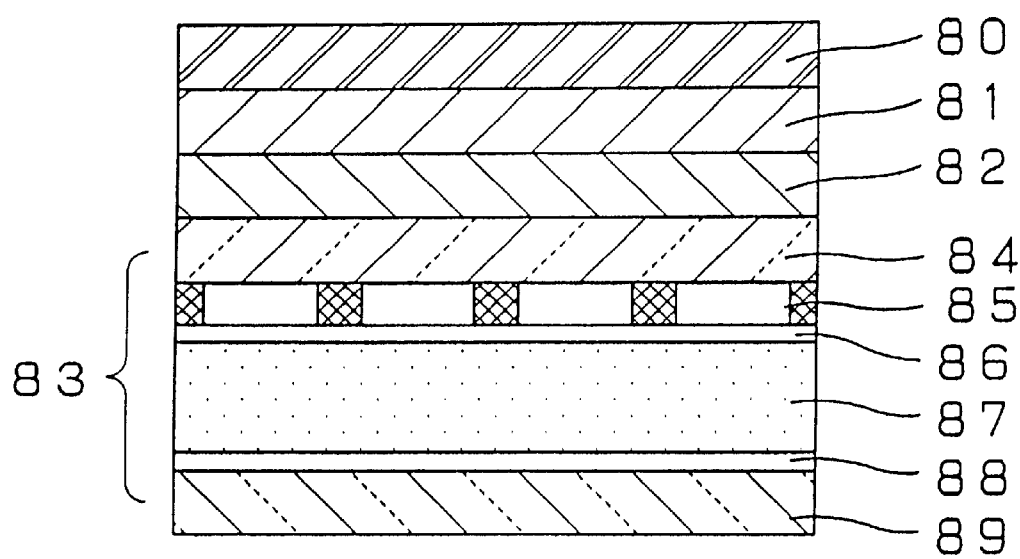
FIG. 13 is a sectional view showing a constituent example of a conventional reflective liquid crystal display device.

That is, as shown in FIG. 12, incident light 32 from the scattering range 28 is scattered when passing through the front scattering film layer 10 to be scattered light 33, and is reflected by the mirror reflector 18 to be reflected light 34. The reflected light 34 advancing in the observer's direction, different from the incident light 32, is hardly scattered when passing through the front scattering film layer 10. Thus, the front scattering film layer 10 concentrates the surrounding light in the observer's direction to utilize effectively, and allows to pass the reflected light advancing in the observer's direction while hardly scattering, so that blurry image is suppressed. In the embodiment, particularly, while scattering the incident light 32 in the range of $10°≦θ≦60°$ ($Δθ=50°$), the reflected light in the direction including the principal observing direction ($0°≦φ<90°$, $270°<φ<360°$; $0°≦θ<10°$) is hardly scattered but allowed to advance, so that a sharp image can be obtained in a wide range.

In the foregoing embodiments 5 to 7, front scattering films with the haze rate of 60% or more in a specified scattering range were used, but not limited thereto, for example, front scattering films with the haze rate of 50% or more in a specified scattering range may be used, or the specified scattering range for heightening the haze rate is not limited to $Δθ=50°$, but various scattering films can be used.

In all embodiments, the number of front scatting films is not limited, and an arbitrary number may be used. When using three or more in embodiments 5 to 7, as being expressed by φ determined on the basis of a specified azimuth, in order that the haze rate may be high in, for example, a range of $90°≦φ≦270°$, it is preferred to laminate the films in consideration of the principal observing direction, etc.

Further, in all embodiments, the liquid crystal cell is not limited to this mode, but similar effects are obtained substantially, regardless of the driving system, such as the reflective liquid crystal display device of active drive by using thin film transistor (TFT). As the mirror reflector 18, a metal reflective electrode containing silver as constituent element was used, but not limited to this, similar effects can be obtained by using a metal reflective electrode containing, for example, aluminum as constituent element. In the embodiments, the scattering film layers 10, 10a, 10b, 10c, 10d are explained at positions shown in FIG. 1, FIG. 3 or FIG. 8, but the positions are arbitrary, not limited, and, for example, if the scattering film layer 10 is formed between the retardation film 12 and polarizer 11 or on the polarizer, same effects as in the embodiments can be obtained.

Thus, according to the invention, comprising the front scattering films of which scattering angle range is asymmetrical to the normal direction of film, scattering is varied in input and output in and out of the reflective liquid crystal display device, and therefore diffusion is limited in a specified direction only, and the concentration of reflected light to the user's side is enhanced, the reflectivity is heightened, and a favorable white display is obtained, and moreover by using a front scattering film almost free from back scattering characteristic, a black display of a sufficiently low reflectivity is obtained, and a high contrast is realized in the reflective liquid crystal display device, which is a very valuable effect.

Also laminating front scattering films in various directions of projection directions onto the film surface in the central angle direction of the scattering angle range, a favorable monochromatic display is possible in multiple directions, and a high contrast is obtained, so that a natural characteristic of viewing field is realized, which is also a very useful effect.

Furthermore, by composing the reflective liquid crystal display device of which front scattering film layer has an incident angle region for scattering more strongly the transmission light than the incidence from the film layer normal direction, or by composing the reflective liquid crystal display device of which scattering film layer includes a scattering film for scattering more strongly the transmission light from the second incident angle region not containing film normal direction than the transmission light from the first incident angle region containing the film normal direction, blurry image is not formed in the principal observing direction (film normal direction) and a sharp image is presented, and also the incident light from other angle direction than the principal observing direction is diffused and concentrated in the principal observing direction, and a favorable white display of a high reflectivity is presented, so that a high contrast is realized, which is also a very valuable effect.

What is claimed is:

1. A reflective liquid crystal display device comprising a polarizer, zero, one or a plurality of retardation films, a scattering film layer formed by laminating a plurality of front scattering films strong in front scattering characteristic and almost free from back scattering characteristic, and a liquid crystal cell having a mirror reflector, wherein at least one of said front scattering films for forming said scattering film layer has its scattering angle range asymmetrical to the normal direction of the film.

2. A reflective liquid crystal display device comprising a polarizer, zero, one or a plurality of retardation films, a scattering film layer formed by laminating a plurality of front scattering films strong in front scattering characteristic and almost free from back scattering characteristic, and a liquid crystal cell having a mirror reflector, wherein all of said front scattering films for forming said scattering film layer have their scattering angle ranges asymmetrical to the normal direction of each film.

3. A reflective liquid crystal display device of claim 1, wherein all of said front scattering films for forming said scattering film layer have the projection directions onto each film surface in the central angle direction of their scattering angle ranges in a range of 90° to 270° counterclockwise, on the basis of 0° of the azimuth in the sitting position direction of a viewer observing said reflective liquid crystal display device.

4. A reflective liquid crystal display device of claim 1, wherein two out of said front scattering films for forming said scattering film layer have the projection directions onto each film surface in the central angle direction of their scattering angle ranges forming an angle range of 0° to 120° to each other.

5. A reflective liquid crystal display device of claim 1, wherein two out of said front scattering films for forming said scattering film layer have the projection directions onto each film surface in the central angle direction of their scattering angle ranges crossing orthogonally to each other.

6. A reflective liquid crystal display device of claim 1, wherein two out of said front scattering films for forming said scattering film layer have the projection directions onto each film surface in the central angle direction of their scattering angle ranges, at about 135° and 225° counterclockwise, on the basis of 0° of the azimuth in the sitting position direction of a viewer observing said reflective liquid crystal display device.

7. A reflective liquid crystal display device of claim 1, wherein two out of said front scattering films for forming said scattering film layer have the projection directions onto each film surface in the central angle direction of their scattering angle ranges forming an angle of about 180° to each other.

8. A reflective liquid crystal display device of claim 1, wherein at least one of said front scattering films for forming said scattering film layer has the projection direction onto the film surface in the central angle direction of its scattering angle range, at about 180° on the basis of 0° of the azimuth in the sitting position direction of a viewer observing said reflective liquid crystal display device.

9. A reflective liquid crystal display device comprising a liquid crystal cell having liquid crystal charged between a pair of substrates, a polarizer disposed at the side of one substrate of said liquid crystal cell, a retardation film disposed between said polarizer and said liquid crystal cell, a scattering film layer disposed at the side of said one substrate, and a mirror reflector disposed at the side of said other substrate of said liquid crystal cell, wherein said scattering film layer has an incident angle region for scattering the transmission light more strongly than the incidence from the film layer normal direction.

10. A reflective liquid crystal display device comprising a liquid crystal cell having liquid crystal charged between a pair of substrates, a polarizer disposed at the side of one substrate of said liquid crystal cell, a retardation film disposed between said polarizer and said liquid crystal cell, a scattering film layer disposed at the side of said one substrate, and a mirror reflector disposed at the side of said other substrate of said liquid crystal cell, wherein said scattering film layer includes a scattering film for scattering the transmission light from a second incident angle region not including the film normal direction more strongly than the transmission light from a first incident angle region including the film normal direction.

11. A reflective liquid crystal display device of claim 10, wherein the scattering characteristic of the transmission light from said first incident angle region and the scattering characteristic of the transmission light from said second incident angle region differ by 45% or more as expressed by the haze rate.

12. A reflective liquid crystal display device of claim 10, wherein the scattering characteristic of the transmission light from said first incident angle region is 20% or less as expressed by the haze rate.

13. A reflective liquid crystal display device of claim 10, wherein the scattering characteristic of the transmission light from said second incident angle region is 50% or more as expressed by the haze rate.

14. A reflective liquid crystal display device of claim 10, wherein said second incident angle region is in a range of $5° \leq \theta \leq 90°$, where $\theta$ is the angle formed by the incident light direction into said scattering film and the film normal ($0° \leq \theta \leq 90°$).

15. A reflective liquid crystal display device of claim 14, wherein said second incident angle region is $\Delta\theta \geq 30°$ in terms of $\theta$, where $\Delta\theta$ is the difference between the maximum value and minimum value of $\theta$ showing said second incident angle region.

16. A reflective liquid crystal display device of claim 10, wherein said second incident angle region is in a range of $90° \leq \phi \leq 270°$, where $\phi$ is the angle formed by the projection component on the film surface in the incident light direction into said scattering film with the reference azimuth in the film surface ($0° \leq \phi < 360°$), and the reference azimuth in the film surface coincides with the sitting position direction of a viewer observing said reflective liquid crystal display device.

17. A reflective liquid crystal display device of claim 10, wherein said scattering film layer includes two or more scattering films laminated so that said second incident angle regions may not be identical.

18. A reflective liquid crystal display device of claim 17, wherein said scattering film layer includes two or more scattering films laminated so that said second incident angle region may be in a range of $60° \leq \phi \leq 300°$, where $\phi$ is the angle formed by the projection component on the film surface in the incident light direction into the scattering film layer with the sitting position direction of a viewer observing said reflective liquid crystal display device ($0 \leq \phi < 360°$).

19. A reflective liquid crystal display device of claim 18, wherein said scattering film layer includes two or more scattering films laminated so that said second incident angle region may be in a range of $90° \leq \phi \leq 270°$, where $\phi$ is the same as above.

* * * * *